(No Model.)
P. E. LAMBERET & A. M. BILLOUD.
EDUCATIONAL APPARATUS.
No. 281,770. Patented July 24, 1883.
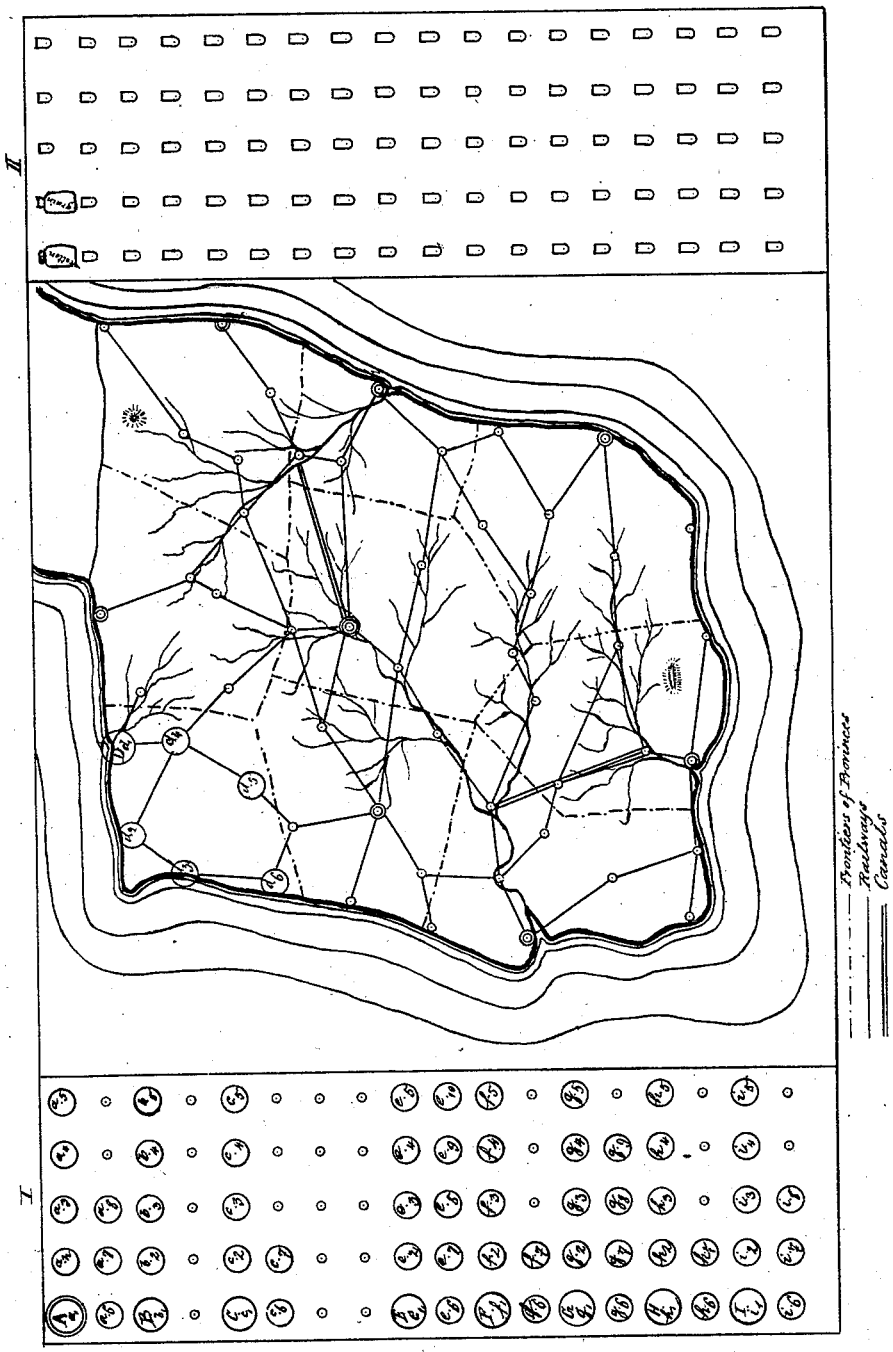
Witnesses.
George Tilghman
Robert Everett
Inventor.
Pierre Eugene Lamberet
& Antoine Marie Billoud
by W H Babcock
Attorney

UNITED STATES PATENT OFFICE.

PIERRE E. LAMBERET AND ANTOINE M. BILLOUD, OF ST. LAURENT LES MACON, FRANCE.

EDUCATIONAL APPARATUS.

SPECIFICATION forming part of Letters Patent No. 281,770, dated July 24, 1883.

Application filed January 29, 1883. (No model.) Patented in France June 26, 1882, No. 149,960.

*To all whom it may concern:*

Be it known that we, PIERRE EUGÈNE LAMBERET and ANTOINE MARIE BILLOUD, citizens of the French Republic, residing at St. Laurent les Macon, in the Republic of France, have invented new and useful Improvements in Educational Apparatus, (for which we have obtained Letters Patent in France, dated 26th day of June, 1882, No. 149,960,) of which the following is a specification.

This invention relates to a new or improved apparatus for teaching geography, and also for assisting in teaching history and the like. It affords a ready and very effective means for impressing upon the memory of pupils the division of a country, its physical aspect, its various productions, both natural and industrial, the means of communication, the birthplaces of celebrated persons, and other facts of interest or importance.

The apparatus consists of a map of peculiar construction, and of markers designed to be used therewith, as represented in the accompanying drawing. The map is preferably made of wood, and represents a country or part of a country, and is of suitable size, according to the purpose for which it is intended. The borders of the several districts or provinces are marked in bright colors, lakes, rivers, and other waters being preferably blue, and canals red. The higher mountains are in relief. Railways are indicated by wires attached to the map, as shown by the single lines in the drawing. The position of the principal places is marked by small holes $d'\, d^2\, d^3\, d^4\, d^5$, &c.; that of others by small hooks. At the right and left of the map are two tablets, I and II, also provided with holes and hooks in rows, and markers which fit into the holes and onto the hooks are provided, each marked with the name of a place on the map, the markers represented in the drawing being shown in their places on the tablet I and marked with the names of several places on the map. A groove in the marker allows, for instance, a portrait of some illustrious person to be slid into the same. These markers will serve to teach historical facts in relation to the various places. To teach facts relating to military matters small flags may be used, while to indicate articles produced at a certain locality small samples of the article itself are preferably used as markers. (See those shown placed on the hooks on tablet II.) All the markers may be used jointly or separately, and by means of the apparatus the tuition will become clear and interesting, and, as the nature and use of the markers strongly appeals to the memory of the pupils or persons using the apparatus, the knowledge will be more readily received and retained. For different subjects different objects can be used as markers to represent them—thus, for instance, representations of ships for harbors, locomotives for railways, and so forth.

In using the apparatus—say in a school—the teacher while delivering his lecture will detach various markers from the tablets and affix them in their proper place on the map, and some or all of the markers so placed may remain upon the map in the interval between the lessons, and being thus constantly visible to the learners the facts which they represent will be readily remembered.

Having now described our invention, we claim—

A detachable marker provided with a groove for allowing the insertion or removal of a portrait or other indication, in combination with a map adapted to have said marker attached to or removed from the same.

PIERRE EUGÈNE LAMBERET.
ANTOINE MARIE BILLOUD.

Witnesses:
EMILE KAPP,
ROBT. M. HOOPER.